(12) United States Patent
Youngblutt et al.

(10) Patent No.: US 11,448,208 B2
(45) Date of Patent: Sep. 20, 2022

(54) STORAGE UNIT FOR HYDRAULIC PUMP AND PUMP ACCESSORIES

(71) Applicant: VIS, LLC, Travelers Rest, SC (US)

(72) Inventors: Sage Youngblutt, Greenville, SC (US); Robert Fox, Greenville, SC (US)

(73) Assignee: VIS LLC, Travelers Rest, SC (US)

( * ) Notice: Subject to any disclaimer, the term of this patent is extended or adjusted under 35 U.S.C. 154(b) by 514 days.

(21) Appl. No.: 16/700,231

(22) Filed: Dec. 2, 2019

(65) Prior Publication Data
US 2021/0123432 A1    Apr. 29, 2021

Related U.S. Application Data

(63) Continuation-in-part of application No. 29/710,909, filed on Oct. 28, 2019, now Pat. No. Des. 935,125.

(51) Int. Cl.
| | | |
|---|---|---|
| *B62B 1/04* | (2006.01) | |
| *F04B 53/00* | (2006.01) | |
| *B62B 1/14* | (2006.01) | |
| *B62B 1/26* | (2006.01) | |
| *B25H 3/04* | (2006.01) | |
| *B62B 1/12* | (2006.01) | |

(52) U.S. Cl.
CPC .............. *F04B 53/00* (2013.01); *B25H 3/04* (2013.01); *B62B 1/14* (2013.01); *B62B 1/26* (2013.01); *B62B 1/12* (2013.01); *B62B 2202/48* (2013.01)

(58) Field of Classification Search
CPC . B62B 2202/48; B62B 2202/022; B62B 1/14; B62B 1/26; B62B 1/12; B62B 2203/60; B62B 3/02; B25H 3/04
See application file for complete search history.

(56) References Cited

U.S. PATENT DOCUMENTS

| | | | | |
|---|---|---|---|---|
| 2,579,639 | A * | 12/1951 | Adams | B25H 5/00 280/30 |
| 2,702,607 | A * | 2/1955 | Sokolik | B62B 1/14 414/595 |
| 2,835,503 | A * | 5/1958 | Humphries | A01G 20/30 D34/24 |
| D185,000 | S * | 4/1959 | Hoover | D34/26 |
| 3,052,323 | A * | 9/1962 | Hopfeld | B62B 1/14 280/5.2 |
| 4,281,843 | A * | 8/1981 | Johnson | B62B 1/26 280/47.26 |
| 4,759,560 | A * | 7/1988 | Virgulti | B25H 3/00 D34/24 |
| 5,113,546 | A * | 5/1992 | Parent | B25H 3/00 312/249.8 |
| 5,429,306 | A * | 7/1995 | Schneider | B05B 9/007 239/152 |
| 5,551,562 | A * | 9/1996 | Beretta | F41C 33/06 190/18 A |
| 5,588,659 | A * | 12/1996 | Boes | B25H 3/04 280/47.35 |
| 6,135,466 | A * | 10/2000 | Irwin | B62B 1/14 280/47.27 |
| 6,264,220 | B1 * | 7/2001 | Pierce | B25H 3/04 280/47.35 |
| 6,398,235 | B1 * | 6/2002 | Cary | B25H 3/00 280/47.35 |

(Continued)

*Primary Examiner* — Emma K Frick
(74) *Attorney, Agent, or Firm* — Thrive IP

(57) ABSTRACT

A wheeled storage unit for supporting a hydraulic pump and pump accessories is provided.

9 Claims, 3 Drawing Sheets

(56) References Cited

U.S. PATENT DOCUMENTS

| | | | |
|---|---|---|---|
| 6,945,546 B2* | 9/2005 | Guirlinger | B25H 3/02 |
| | | | 280/47.35 |
| 7,188,846 B2* | 3/2007 | Deavila | A47K 1/02 |
| | | | 280/30 |
| 7,252,297 B1* | 8/2007 | Barritt | B23K 7/10 |
| | | | 280/79.5 |
| 8,087,679 B1* | 1/2012 | Salvucci, Jr. | B62B 3/04 |
| | | | 280/654 |
| 8,783,587 B2* | 7/2014 | Bearup | B05B 9/007 |
| | | | 239/722 |
| 8,955,854 B2* | 2/2015 | Taranto | B62B 1/14 |
| | | | 280/47.35 |
| 9,434,400 B2* | 9/2016 | Olson | A47L 11/4091 |
| 10,377,401 B2* | 8/2019 | Thibault | B62B 5/0033 |
| 10,473,413 B1* | 11/2019 | Laird | F28G 1/163 |
| 10,875,562 B2* | 12/2020 | Nelson | B65H 57/18 |
| 2015/0097348 A1* | 4/2015 | Steinfels | F16M 11/2014 |
| | | | 280/47.35 |
| 2021/0260747 A1* | 8/2021 | Karlsson | B25H 3/028 |

\* cited by examiner

STORAGE UNIT FOR HYDRAULIC PUMP AND PUMP ACCESSORIES

RELATED APPLICATIONS

This application is a continuation in part of U.S. application Ser. No. 29/710,909 filed on Oct. 28, 2019 and which is incorporated herein by reference.

FIELD OF THE INVENTION

This invention is directed towards a wheeled storage unit for supporting a hydraulic pump and pump accessories.

BACKGROUND OF THE INVENTION

This invention relates to mobile storage units for heavy and bulky tools such as those used in a commercial automotive repair facility. Frequently, there is a need to move equipment within a commercial repair facility from one work area to another and a wheeled support stand or general use dolly may be used to transport the equipment. Often, the equipment has numerous accessories which also need to be utilized along with the equipment.

Portable hydraulic power kits are primarily used in the automotive after market for vehicle body and fender repair and sometimes referred to as collision repair kits. They are stored and transported in plastic, composite or metal cases that are vulnerable to cracking and breaking. The larger kits are too heavy to carry so wheels are added to the cases which are also vulnerable to cracking and breaking.

While there have been a number of support tables and wheeled apparatuses that can be used to transport equipment, there remains room for variation and improvement within the art.

SUMMARY OF THE INVENTION

It is one aspect of at least one of the present embodiments to a portable storage unit for a hydraulic pumps and ram comprising:

a L-shaped frame having a pair of vertical uprights connected to a base, the L-shaped frame further having a pair of curved upper handles;

a pair of wheels positioned along the rear portion of the base;

a first shelf supported by the base, defining a plurality of first shelf apertures;

a second shelf positioned above the base and supported by notches positioned on either side of the second shelf and which engages opposing sides of the frame, the second shelf further defining a plurality of second shelf apertures;

a third shelf positioned above the second shelf and supported by a pair of bushings, the pair of bushings connected to and adjustable with respect to a location on opposite sides of the frame, the third shelf further defining a central slot adapted for receiving a support flange of a hydraulic pump, the third shelf further defining a plurality of third shelf apertures;

a V-shaped bracket supported below the pair of curved handles, the bracket further defining a front surface, the front surface defining a plurality of key holes;

wherein the first shelf apertures, the second shelf apertures, and the third shelf apertures are all adapted for receiving support posts which extend above the respective upper shelf surfaces and further adapted for supporting accessories for use with a hydraulic pump.

It is a further aspect of at least one of the present embodiments to provide for a portable storage unit as described above wherein the L-shaped frame is constructed of round tubing.

It is a further aspect of at least one of the present embodiments to provide for a portable storage unit as described above wherein the V-shaped bracket defines a connector adapted for reversibly engaging a support flange of a hydraulic pump.

It is a further aspect of at least one of the present embodiments to provide for a portable storage unit as described above wherein the first shelf is positioned forwardly of the pair of wheels.

It is a further aspect of at least one of the present embodiments to provide for a portable storage unit as described above wherein the second shelf and the third shelf are each positioned forwardly above a plane of the wheeled axis and extends in a forward direction a distance that does not extend beyond a rear wall plane of the first shelf.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

As used herein, the term "about" means a stated value plus or minus 10% unless a more specific range is provided within the specification.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
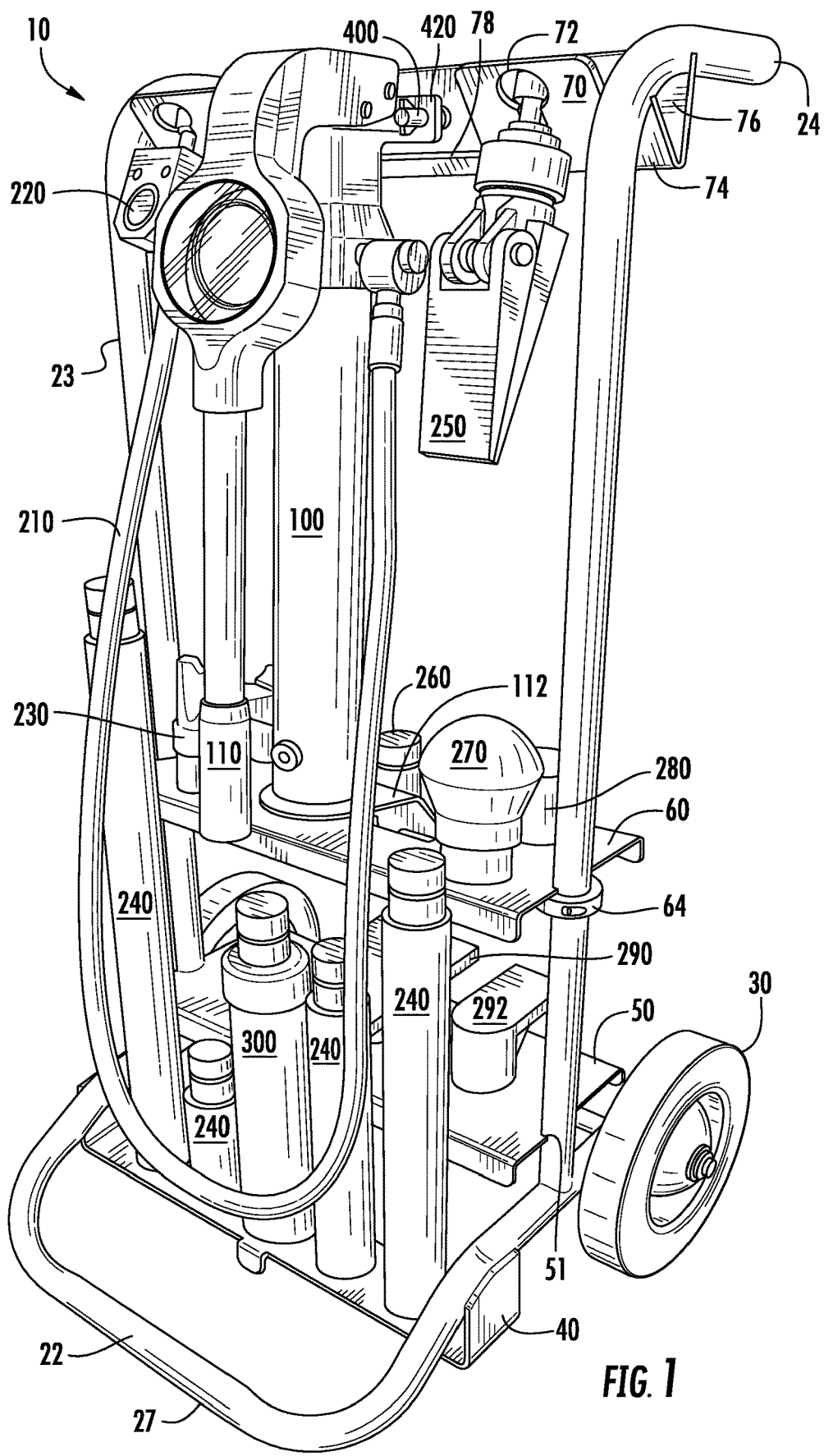
FIG. 1 is a perspective view of a portable storage unit showing a hydraulic power unit with multiple accessories supported thereon.

As best seen in reference to FIG. 1, a portable storage unit 10 is provided that is adapted for supporting a hydraulic pump cylinder 100 having a handle actuator 110. The storage unit 10 has a L-shaped frame 20 that is formed from a pair of vertical uprights 21 and 23 in which are connected to a lower base 22 upper portion of the vertical uprights 21 and 23 are connected to a curved handle 24 positioned along the rear side of uprights 21 and 23.

Attached to the bottom of the frame 20 are a pair of wheels 30 which positioned along a rear portion of the base and are offset behind the vertical uprights 21 and 23. The base 22 supports a first shelf 40, shelf 40 defining a plurality of first shelf apertures 42 as best seen in reference to FIG. 3.

A second shelf 50 is positioned above the base and is supported by a pair of notches 51 positioned on either side of the second shelf 50 and which engage opposing sides of the vertical frame uprights 21 and 23. The second shelf 50 further defines a plurality of second shelf apertures 52 along the upper shelf surface. As seen in reference to FIG. 3, the second shelf 50 defines on a left rear surface a pair of slots with an intervening raised tongue portion that is adapted for supporting a ram toe 230 best seen in reference to FIG. 3.

A third shelf 60 is positioned above the second shelf 50 and its supported by a pair of bushings 64 each of the respective pair of bushings connected to opposing sides of the frame uprights 21 and 22. The third shelf further defines a central slot 66 and extends along a partial width of third shelf 60 as adapted for supporting therein a support flange 112 of a hydraulic power unit 100. The third shelf 60 further defines a plurality of third shelf apertures 62 and a slot 66. Slot 66 extends laterally along a width of the shelf 60 and intersect with both a vertical axis of frame 20 and within a plane of a horizontal axis of frame 20.

Figure 2:
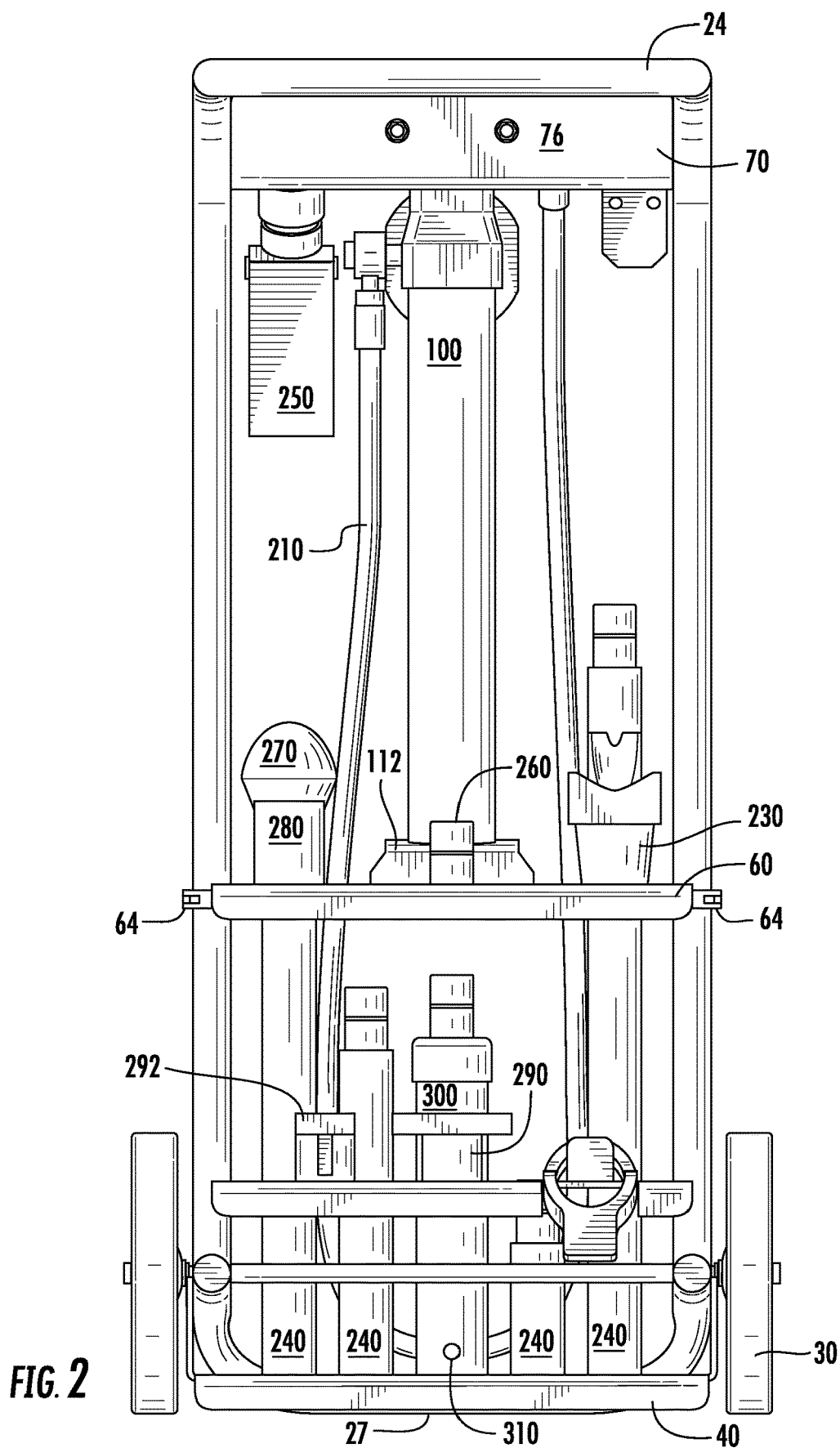
FIG. 2 is a rear view of the portable storage unit with the power unit and supported accessories.

As seen in within the FIGS. 1 and 2, the first shelf apertures 42, the second shelf apertures 52 and the third shelf apertures 62 are adapted for receiving support posts 80 which extend above the respective upper shelf surfaces and are adapted for supporting the various accessories as seen in reference to FIGS. 1 and 2, the accessories including the hydraulic power unit 100 and optional attachments thereto.

The post 80 can be secured through the use of lock washers and screws through an aperture on a lower surface of a support post 80. Support post 80 as seen in FIG. 1, may define a circumferential groove 82 along the exterior of the post 80 that can engage a metal spring 84. The flexing of the spring 84 within the groove 82 will help secure the accessories to the support post 80. Similar grooves and springs can be present on the male end of various accessories.

It is also envisioned that the support post 80 could be in the form of a quick release connector or coupling in which the corresponding inserted accessories can have an actuator designed to release the accessory from the quick release connector.

Figure 3:
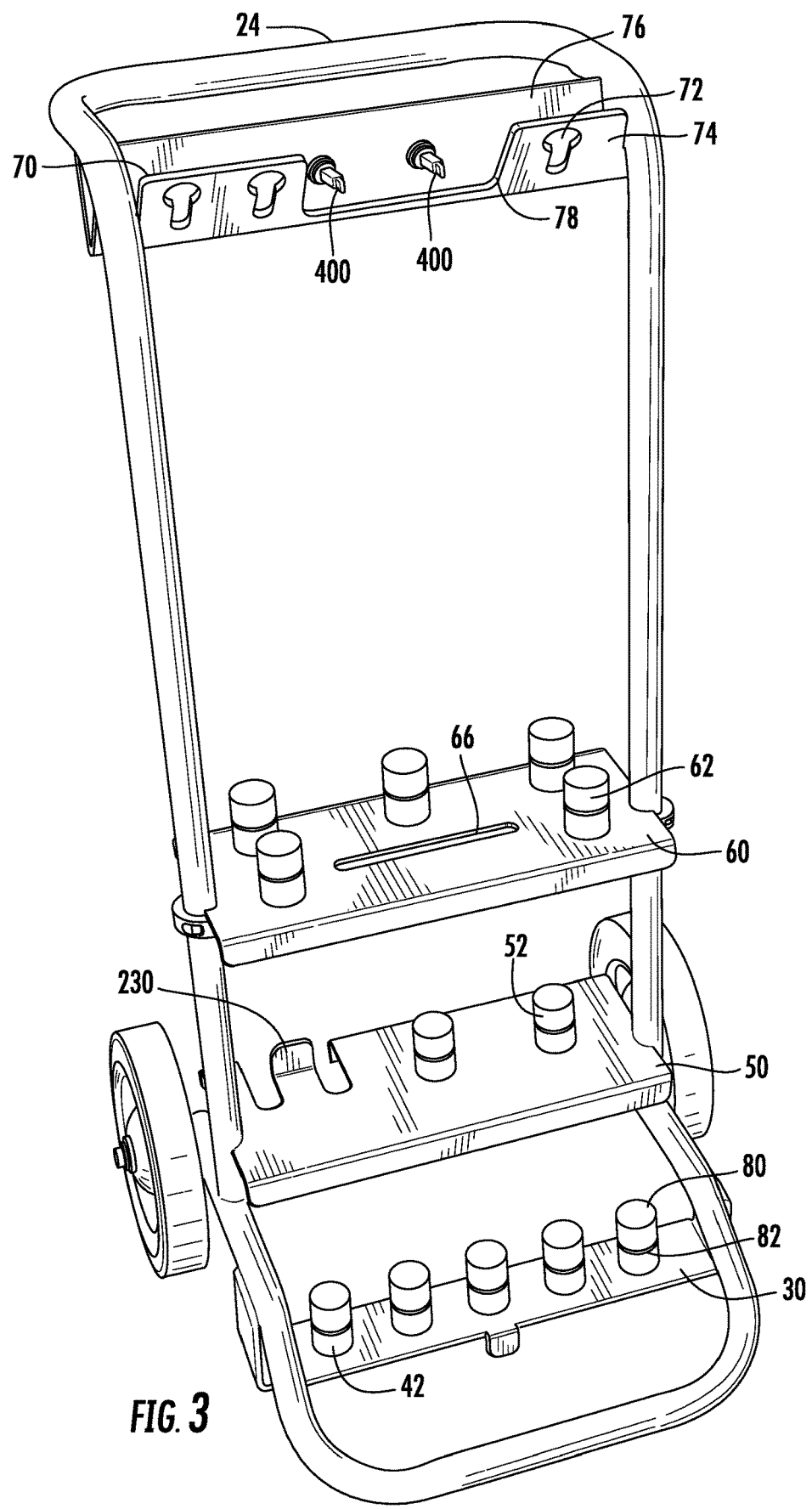
FIG. 3 is a front view similar to FIG. 1 of the portable storage unit without the hydraulic power unit and accessories.

As seen in reference to FIGS. 1 and 3, a V-shaped bracket 70 may be mounted and supported below the pair of curved upper handles 24, the bracket 70 further defining a rear surface 76, a front surface 74 having a plurality of key holes 72 defined therein to support hydraulic pump accessories. A notch 78 is formed within front surface 74 to provide access to the new surface 76.

As seen in reference to FIG. 1, the key holes can be used to support the spreader 250 and short ram 220. Additionally, the V-shaped bracket 70 defines a pair of connectors 400 which will reversibly engage the hydraulic pump cylinder's support flange 420. The connectors 400 will enter engage with the flange 420 such that pivoting movement of the handle 120 can be maintained when the hydraulic pump 100 is supported on storage unit 10. As illustrated in FIG. 3, the connectors 400 are secured to a rear wall of the V-shaped bracket 70 and are accessible through a notch formed within a front wall of the bracket 70.

As seen in reference to FIG. 1, the base 22 has a substantially rectangular profile but the front edge curves downwardly such that the lower most lip 27 will support a front of the storage unit 10 while the pair of wheels 30 support the rear of the support unit 10. The distance between the front lip 27 and the axis of the wheels 30 are such that conventional weight of a four ton or ten ton capacity hydraulic power unit and accessories can be supported in the upright position as illustrated in FIGS. 1-3. Additionally, the positioning of the respective shelves 40, 50, and 60 provide a stable support for the optional accessories such that any combination of the accessories whether installed or uninstalled will maintain a balance and stability to the storage unit 10. The storage unit 10 can also be placed in a substantially horizontal position in which the handle 24 and the pair of wheels 30 will engage a floor surface. When in the horizontal configuration, the accessories remain stably engaged and intact.

In both the upright and in the horizontal configurations, the hydraulic unit 100 is accessible. As is known in the art, the handle 110 can be used to engage the hydraulic pump. As is conventional in the art, the hydraulic pump has a hose 210 that may be connected to a short ram 220, a larger ram 300 with inlet 310, or a spreader 250.

As seen in reference to FIG. 1, the hydraulic unit 100 is supported along a vertical axis defined by the frame 20. Further, the placement of the hydraulic cylinder 100 is substantially centered with respect to the lateral edges of frame 20 and along a horizontal plane defined along a horizontal axis of the frame. It has been found that this placement helps with the stability and maneuverability of the storage unit 10 when supporting the hydraulic cylinder 100 and the various accessories.

A non-limiting example of other accessories as seen in reference to FIGS. 1 and 2 include a wedge head 230, a plurality of extension tubes 240, a male connector 260, a rubber head 270, a serrated saddle 280, a flat base 290, and a plunger toe 292.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A portable storage unit for a hydraulic pumps, rams and accessories comprising:
    a L-shaped frame having a pair of vertical uprights connected to a base, the L-shaped frame further having curved handles along an upper rear portion of the frame;
    a pair of wheels positioned along the rear portion of the base;
    a first shelf supported by the base, defining a plurality of first shelf apertures;
    a second shelf positioned above the base and supported by notches positioned on either side of the second shelf and which engages opposing sides of the frame, the second shelf further defining a plurality of second shelf apertures;
    a third shelf positioned above the second shelf and supported by a pair of bushings, the pair of bushings connected to and adjustable with respect to a location on opposite sides of the frame, the third shelf further defining a central slot adapted for receiving a support flange of a hydraulic pumps, the third shelf further defining a plurality of third shelf apertures;
    a V-shaped bracket supported below the pair of curved handles, the bracket further defining a front surface, the front surface defining a plurality of key holes;
    wherein the first shelf apertures, the second shelf apertures, and the third shelf apertures are all adapted for receiving support posts which extend above the respective upper shelf surface, the support posts adapted for supporting accessories for use with a hydraulic pump.

2. The portable storage unit according to claim 1 wherein the L-shaped frame is constructed of round tubing.

3. The portable storage unit according to claim 1 wherein the V-shaped bracket defines a connector adapted for reversibly engaging a support flange of a hydraulic pump cylinder.

4. The portable storage unit according to claim 1 wherein the first shelf is positioned forwardly of the pair of wheels.

5. The portable storage unit according to claim 1 wherein the second shelf and the third shelf are each positioned forwardly above a plane of the wheeled axis and extends in a forward direction a distance that does not extend beyond a rear wall plane of the first shelf.

6. The portable storage unit according to claim 1 wherein the third shelf further defines a slot which is adapted for receiving a support flange of a hydraulic pump cylinder.

7. The portable storage unit according to claim 6 wherein the slot is positioned within an axial plane defined by the pair of vertical uprights.

8. The portable storage unit according to claim 6 wherein the slot is positioned between the vertical uprights to extends length-wise across a portion of the third shelf.

9. The portable storage unit according to claim 1 wherein at least one of the first shelf apertures, the second shelf apertures, and the third shelf apertures have at least one support post positioned within at least one of the apertures, the support post further defining a circumferential groove, the groove containing a spring which is retained within the grove.

* * * * *